United States Patent [19]

Sakaue et al.

[11] Patent Number: 4,617,502
[45] Date of Patent: Oct. 14, 1986

[54] METHOD AND APPARATUS FOR CONTROLLING A ROBOT HAND ALONG A PREDETERMINED PATH

[75] Inventors: Shiyuki Sakaue, Yokohama; Koichi Sugimoto, Hiratsuka; Shinichi Arai, Yokohama, all of Japan

[73] Assignee: Hitachi, Ltd., Tokyo, Japan

[21] Appl. No.: 623,455

[22] Filed: Jun. 22, 1984

[30] Foreign Application Priority Data

Jun. 30, 1983 [JP] Japan ............................. 58-116995
Jan. 25, 1984 [JP] Japan ............................. 59-10038

[51] Int. Cl.⁴ .............................................. G05B 19/42
[52] U.S. Cl. .................................... 318/568; 318/636; 364/513
[58] Field of Search ............... 318/568, 636, 561, 567; 364/513

[56] References Cited

U.S. PATENT DOCUMENTS

| | | | |
|---|---|---|---|
| 3,934,186 | 1/1976 | Hayakawa et al. | 318/567 |
| 4,321,516 | 3/1982 | Ohtsuka | 318/636 X |
| 4,429,260 | 1/1984 | Tradt | 318/568 |
| 4,511,985 | 4/1985 | Inaba et al. | 318/568 X |

FOREIGN PATENT DOCUMENTS 0058609 7/1983 Japan ................................... 318/568

Primary Examiner—B. Dobeck
Attorney, Agent, or Firm—Beall Law Offices

[57] ABSTRACT

A method and apparatus for controlling a robot hand along a predetermined path at a predetermined speed in space between two points, wherein the value of a command speed is determined on the basis of position information and velocity information on the robot hand, more particularly, on the basis of the sum of a value proportional to the positional deviation of the robot hand from the predetermined path, a value proportional to accumulated positional deviation determined during sampling operations carried out from a start point, a value proportional to the speed deviation of the robot hand from the predetermined speed within a constant-speed region, and a value proportional to accumulated speed deviation determined during sampling operations carried out from an initial sampling point within the constant-speed region.

35 Claims, 8 Drawing Figures

METHOD AND APPARATUS FOR CONTROLLING A ROBOT HAND ALONG A PREDETERMINED PATH

BACKGROUND OF THE INVENTION

This invention relates generally to a method and apparatus for controlling a robot hand along a predetermined path. More particularly, the invention relates to a method and apparatus for controlling a robot hand, which is suitable for use in improving the accuracy with which the robot hand moves along the predetermined path and at a predetermined speed, and effectively applicable to the control of the robot having a plurality of axes of motion which determine a position and orientation of the robot hand.

Recently, the robots have been more and more introduced to various industrial fields for automating work or promoting labor welfare. This wide application of the robots creates needs for controlling the robot hand precisely along the predetermined path at the predetermined speed. An interpolating method is known as one of the effective control techniques for precisely moving the robot hand, which interpolates the path of the robot hand between teaching points.

Methods of interpolating the path of the robot hand include a method based on position-controlling operations and a method based on speed-controlling operations. In the method based on position-controlling operations, actual position data obtained by subjecting an actual pair displacement which indicates the actual position of the robot hand to coordinate conversion, and target position data are used to compute a target position for a subsequent sampling operation. The actual pair displacement is subtracted from a target pair displacement obtained by subjecting the target position to coordinate conversion, and the resultant value is multiplied by k to determine an instruction pair displacement, the target value, for each rotary pair, and these instruction pair displacements are input to a driving system. The driving system is provided with the same number of driving circuits of the same construction as the number of degrees of freedom of the robot hand.

On the other hand, the method based on speed controlling operations is carried out as follows. Namely, when an instruction for moving a robot hand from its present position to a target position is given, a target speed for a subsequent sampling operation is computed on the basis of the actual position data and the target position data, and the target speed is subjected to coordinate conversion to determine a pair speed for each rotary pair, and these pair speeds are input to a driving system.

In the method of interpolating the path of a robot hand which is based on speed-controlling operations, one of the conventional methods, a speed curve with respect to a predetermined path is established in advance, and the target position for the subsequent sampling operation is determined by using the speed curve. However, the speed of the robot hand deviates constantly from a re-set speed curve, since it varies with load. Consequently, the robot hand moves off the path, or the speed of the robot hand varies to prevent the robot hand moving at a constant speed. Once the robot hand has moved off the path, it is impossible to return it thereto. This means that it is difficult to move the robot hand correctly along the path.

Another path-interpolating method has been developed with a view to eliminating the drawbacks encountered in the above methods. In this method, the deviation of the robot hand from a pre-set path is computed, and the value of a controlling speed proportional to the resultant deviation is added to a command speed value to improve the accuracy with which the robot hand moves along the pre-set path. However, this method of interpolating the path of a robot hand cannot improve to a fully satisfactory extent the accuracy with which the robot hand moves along the pre-set path.

SUMMARY OF THE INVENTION

An object of the present invention is to provide a method and apparatus for controlling a robot hand along a predetermined path which can enable the robot hand to move along the path at a constant speed with a high degree of accuracy.

The characterizing feature of the method and the apparatus according to the present invention resides in that they include a step or means for determining the value of a command speed which is used to correct the positional deviation of the robot hand from a designated path and the speed deviation thereof from a designated speed, on the basis of a position information and a velocity information on the robot hand, more particularly, on the basis of the sum of a value proportional to the positional deviation of the robot hand from the predetermined path, a value proportional to accumulated positional deviation determined during sampling operations carried out from a start point, a value proportional to the speed deviation of the robot hand from the predetermined speed within a constant-speed region, and a value proportional to accumulated speed deviation determined during sampling operations carried out from an initial sampling point within the constant-speed region.

DESCRIPTION OF THE PREFERRED EMBODIMENT

Figure 1:
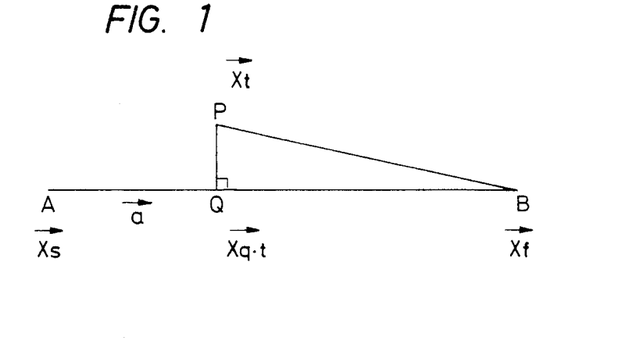
FIG. 1 illustrates the principle of the method of controlling a robot hand according to the present invention.

The principle of the present invention will now be described with reference to FIG. 1. A straight line extending from a start point A to an end point B is the given path. A point which the robot hand passes during its movement is designated by the letter P, and a point at which a perpendicular from the point P meets the given path is designated by the letter Q. Position vectors of the positions A,B,P,Q are designated by $\vec{x}_s, \vec{x}_f, \vec{x}_t, \vec{x}_{q,t}$, respectively, and the direction vector of the path by $\vec{a}$. Accordingly, a positional deviation vector $\vec{e}$ and a speed deviation vector $\vec{e_v}$ can be expressed as follows:

$$\vec{x_{q,t}} = \vec{x_f} - \{(\vec{x_f} - \vec{x_t}) \cdot \vec{a}\}\vec{a} \qquad (1)$$

$$\vec{e} = \vec{x_{q,t}} - \vec{x_t} \qquad (2)$$

$$\vec{v_t} = (\vec{x_{q,t}} - \vec{x_{q,t-1}})/T \qquad (3)$$

$$\vec{e_v} = \vec{v_t} - v_O\vec{a} \qquad (4)$$

In these equations $v_O$ is a designated speed, and T a sampling period. The letter t represents the number of sampling operations, and $t-1$ the value thereof in a preceding operation.

A vector $\vec{u}$ of a command speed value is determined as follows, on the basis of these equations.

$$\vec{u} = v_t\vec{a} + k_1\vec{e}/T + k_2\Sigma\vec{e}/T + k_3\vec{e_v} + k_4\Sigma\vec{e_v} \qquad (5)$$

In this equation, $v_t$ is a speed of the robot hand at a sampling time t, the symbol $\Sigma e$ represents accumulated positional deviation during the sampling operations carried out from the start point A, $\Sigma e_v$ accumulated speed deviation during the sampling operations carried out from the initial sampling point, and $k_1$-$k_4$ are proportional coefficients. The path-interpolating operation according to the present invention is carried out on the basis of this vector u of the command speed value.

A method of determining the proportional coefficients will be described later.

The present invention will now be described in more detail with reference to an embodiment thereof shown in the accompanying drawings.

Figure 2:
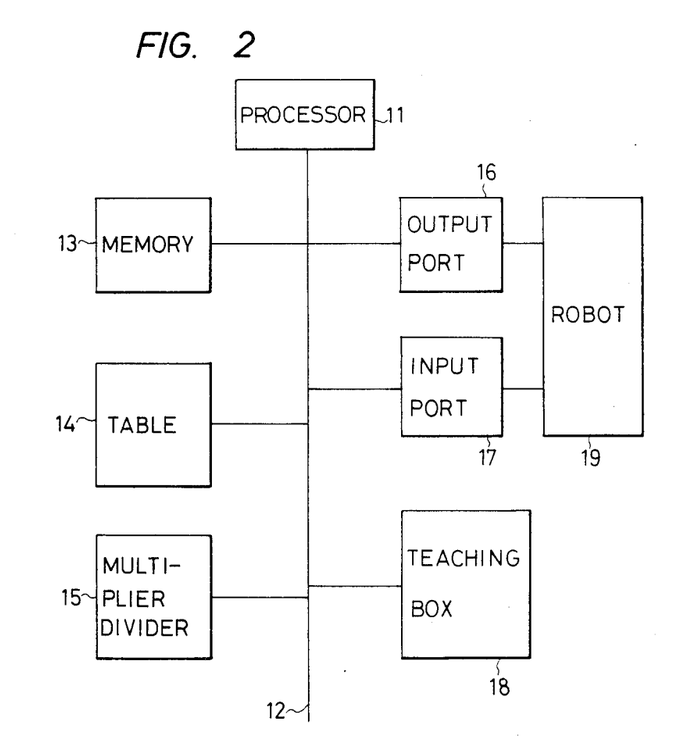
FIG. 2 is a block diagram of an example of an apparatus according to the present invention.

FIG. 2 is a block diagram of an example of a control apparatus used to practice the method of controlling a robot hand according to the present invention. Referring to FIG. 2, a processor 11 is connected to a memory 13, a table 14, a multiplier divider 15, an output port 16, an input port 17, and a teaching box 18 by a bus 12. The output port 16 and the input port 17 form output and input units between a robot 19 and the bus 12.

The processor 11 executes various different computation and controlling operations, and supervises the operations of the memory 13, table 14, multiplier divider 15, output port 16, input port 17 and teaching box 18 over the bus 12. The memory 13 holds computation control programs and various other data. The table 14 is a data table which holds trigonometric functions and reciprocal trigonometric functions. The multiplier divider 15 is dedicated hardware used for multiplication and division. The teaching box 18 is a console acting as a man-machine interface during teaching; teaching data obtained from a drive system or sensors of the robot are stored in the memory in accordance with instructions from the teaching box 18.

In accordance with instructions from the teaching box 18, a predetermined part of the robot 19 is driven to a predetermined position. The displacement of an actuator at this position is detected by a rotary displacement detector, and the position of the robot hand in space is computed from the value of this displacement, the position of the robot hand being stored as teaching data in the memory 13. In order to operate the robot hand in practice, teaching data is first read from the memory 13, in accordance with the operational mode being used. The teaching data is then subjected to point-to-point interpolation according to an instruction (for example, a speed instruction) from the teaching box 18.

Figure 3:
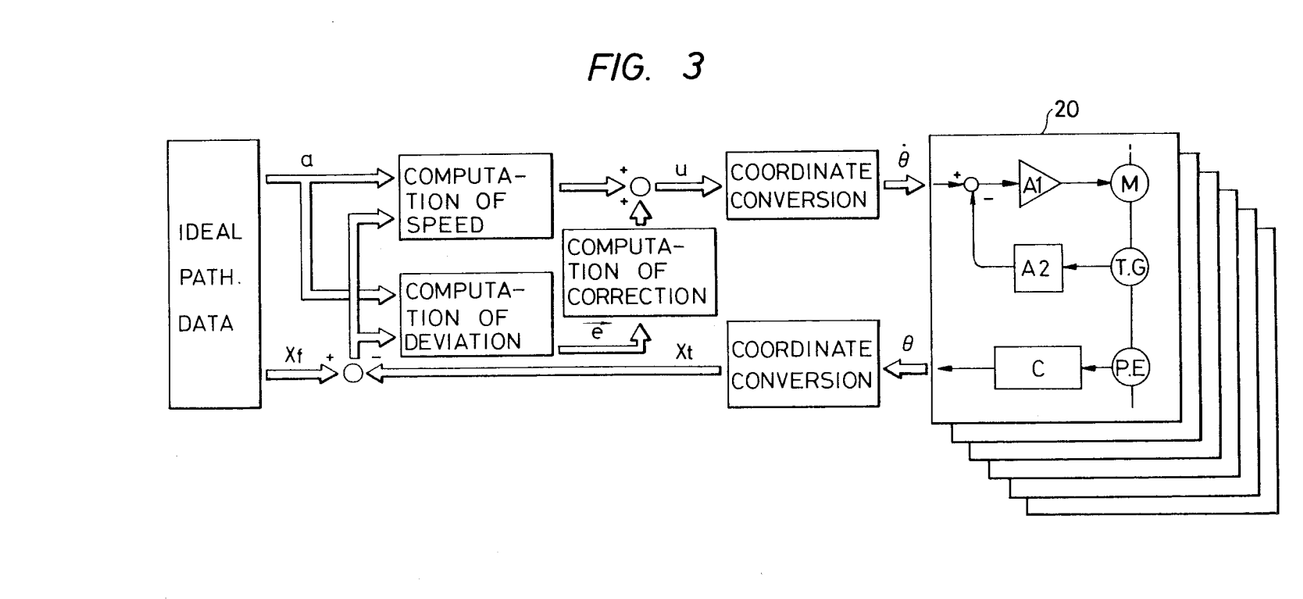
FIG. 3 illustrates the operation of the apparatus shown in FIG. 2.

The interpolation of the path between points will now be described with reference to FIG. 3. First, the path direction data a is computed from the start position data and the target position data $x_f$ in the memory 13. The coordinates of the pair displacement $\theta$ of the robot hand, which is obtained from a detector of the rotary displacement of the robot, are then converted by the processor 11, multiplier divider 15 and table 14, to obtain the actual position data $x_t$ in the rectangular coordinate system. The computation with equations (1), (2), (3), (4) using the actual position data $x_t$, the target position data $x_f$ and the path direction data a is done by the processor 11 and the multiplier divider 15, to determine the command speed value u for the subsequent sampling operation.

The coordinates of the command speed value u are then converted by the processor 11, table 14 and the multiplier divider 15 to obtain a command speed value $\theta$ for each pair, which become command values for the drive system 20 which is provided with the same number of driving circuits of the same construction as the number of degrees of freedom of the robot hand, wherein each of the driving circuits consists of a motor M, a tachometer generator TG, a rotary displacement detector PE, a counter C, a servo-amplifier A1, and an amplifier A2.

Next will be described a method which can determine optimum values of the proportional coefficients $k_1$~$k_4$ to obtain the most accurate path during playback.

Figure 4A:
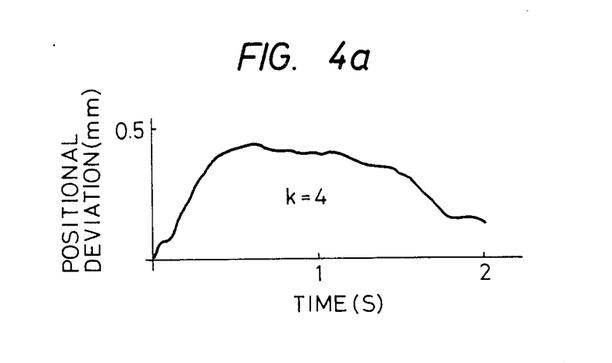
FIG. 4a, FIG. 4b, FIG. 4c illustrate the relationship between the size of a proportional coefficient and positional deviation within one playback operation.
Figure 4B:
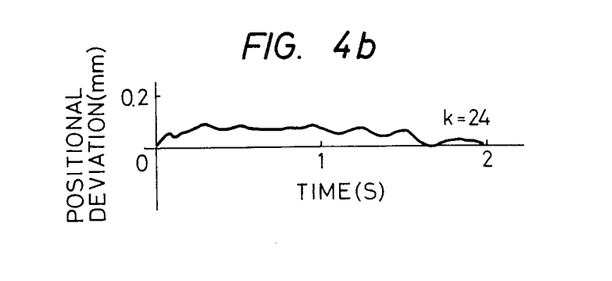
Figure 4C:
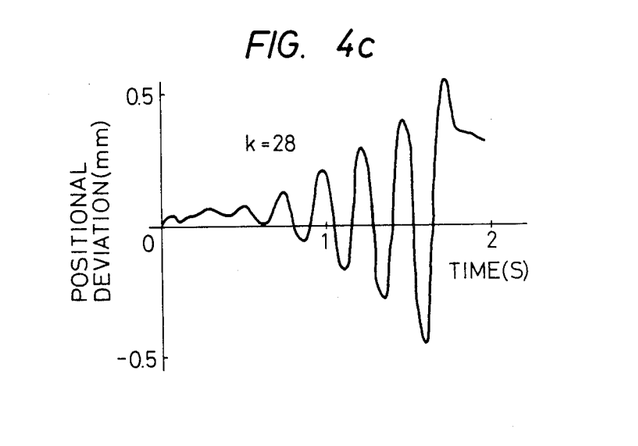

FIG. 4a~4c show actual data on the relationship between the values of proportional coefficients and the accuracy of a path, which was obtained during an operation in which two points at some distance apart were taught to a robot, and then the robot played back a straight-line movement between those two points. In FIG. 4a~4c, the abscissa denotes time, and the ordinate the P positional deviation of the actual path from a predetermined path.

The robot used to obtain this data had an upper arm length of 800 mm, a forearm length of 600 mm and 5 degrees of freedom. The playback operation was carried out with a sampling time of 35 ms, a movement command speed of 100 mm/s, and a trapezoidal speed pattern with uniform acceleration.

A changed proportional coefficient is used for proportionally feeding back actual positional deviation in the subsequent sampling period, and corresponds to the coefficient in a proportional compensation term in PID control. The other three proportional coefficients are set to zero. In FIG. 4a~4c, the proportional coefficient is substituted by a variation k. When the proportional coefficient is small (k=4), the positional deviation varies as shown in FIG. 4a. When the proportional coefficient is 24, i.e. k=24, the deviation varies as shown in FIG. 4b; in this case, the positional deviation is reduced to about ½ that of the case shown in FIG. 4a. When the proportional coefficient is 28, i.e. k=28, the proportional compensation is too large, as shown in FIG. 4c. Therefore, large oscillations occur, so that the positional deviation increases again.

Figure 5:
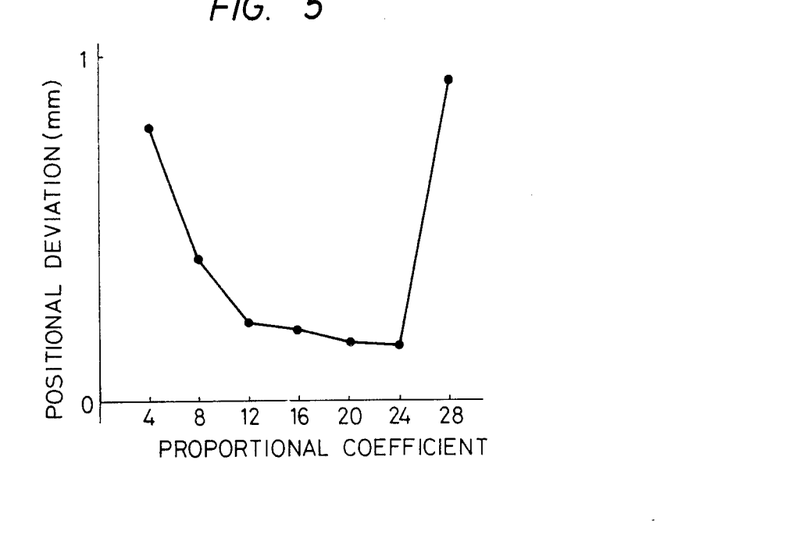
FIG. 5 illustrates the relationship between the size of the proportional coefficient and the positional deviation.

FIG. 5 is a graph in which the ordinate denotes the direction of the average positional deviation per sampling period, which is determined by dividing the sum of the absolute values of the positional deviations shown in FIG. 4a~4b in all the sampling periods by the number of samples, with the proportional coefficient along the abscissa. As shown in this graph, when the proportional coefficient increases, the absolute value of the positional deviation gradually decreases but starts to increase again at a certain position.

Namely, the curve in FIG. 5 projects downward (at one side). The same results can be obtained for the other three proportional coefficients. Accordingly, in order to determine the value of proportional coefficient which enables the reduction of the corresponding positional deviation to the lowest level, the proportional coefficient must be increased from zero gradually to determine the point at which the monotonic decrease in positional deviation changes into a monotonic increase therein. The value of the proportional coefficient thus determined is called an optimum value of the proportional coefficient.

When the value of one proportional coefficient is varied after the optimum value of another proportional coefficient has been determined, the previously-determined optimum value varies slightly. Therefore, if the optimum values of four different proportional coefficients are determined in sequence, and the same operations are repeated in the vicinity of these optimum values, eventually the true optimum values can be determined.

Accordingly, in order to determine the optimum values of the four proportional coefficients used when the operation of a robot hand is played back linearly between two predetermined points, an apparatus which will now be described could be provided.

Namely, an apparatus can be used that gives the robot hand an instruction for the playback with the four proportional coefficients set at arbitrary levels, measures the positional deviations between the predetermined path and the path along which the robot hand actually moved within each of the sampling periods during the playback, determines a sum of the absolute values of the positional deviations, compares the sum of absolute values of the positional deviations with that in other cases in which the proportional coefficients have other values, determines the optimum values on the basis of a graph such as that of FIG. 5, and stores the optimum values thus obtained in a memory.

In the circuit of FIG. 2, the four proportional coefficients within the memory 13 are initially set at small values by an instruction from the teaching box 18. Playback along a path is then done in accordance with the program data stored in the memory 13. During this operation, a value on a displacement detector for the actuator is read and stored in the memory 13 during each sampling period as data on the path of the robot. After the playback has been completed, the position of the robot hand in space is determined by calculations based on the data on the path of the robot stored in the memory 13, and distances between the position thus determined and the theoretical path of the robot during the playback is then determined. The absolute values of these distances are added during each sampling period, and the results are stored in the memory 13.

The value of any one of the four proportional coefficients is doubled, and the same operation is repeated. The sums of the absolute values obtained and the values stored in the memory 13 are compared, and the following operations done:

(1) When the value of the proportional coefficient used in the preceding step is greater than that stored in the memory, the value of the proportional coefficient is again increased by a uniform difference, and the operation is repeated.

(2) When the value of the proportional coefficient used in the preceding step is less than that stored in the memory, a value midway between these values is set as the value of the proportional coefficient used in the subsequent step, and the operation is repeated.

(3) A value midway between the value of the proportional coefficient used in the preceding step and the value of the proportional coefficient used in the current step is set as the value of the proportional coefficient used in the subsequent step, and the operation is repeated. When the value stored in the memory is equal to that used in the preceding step, a value of the proportional coefficient which is midway between those used in the preceding and current steps is determined to be the optimum value of the proportional coefficient.

This operation is repeated until the optimum values of the other three proportional coefficients have been determined. This procedure is then repeated once again based on these optimum values to determine the final optimum values of the proportional coefficients which are stored in the memory. Thus these final optimum values can be extracted as the proportional coefficients during the execution of the regular playback operation, i.e. as part of the data required for the playback between the predetermined points.

When the optimum values of these proportional coefficients are stored in an instructions area for this playback, which requires a highly-accurate path within the playback programs in the memory, a plurality of playback operations with highly-accurate paths can also be carried out.

This method enables a large improvement in the accuracy of a linear path, and the accuracy with which a robot can be kept at a constant speed can be improved up to a level corresponding to the upper limit of the capacity of the robot controller. Moreover, the control of the path and the speed of the robot can be done automatically, so that the operational efficiency of the robot-driving means can be improved greatly.

Figure 6:
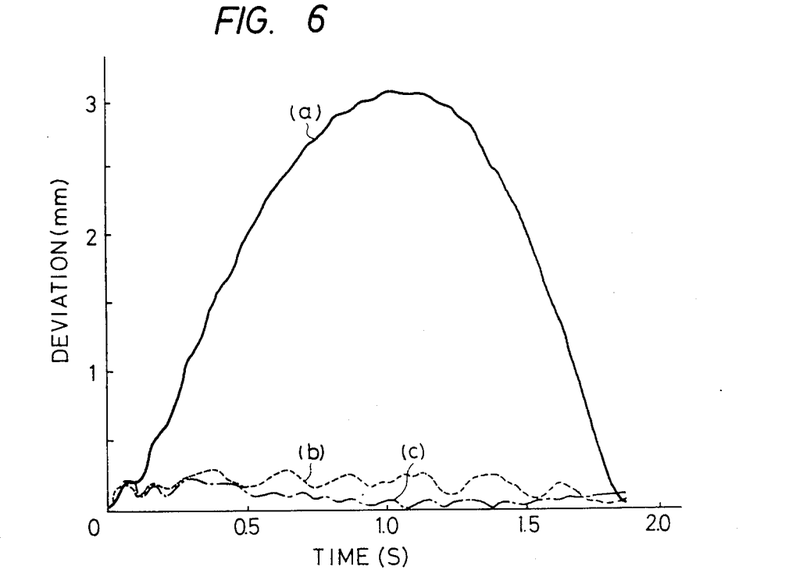
FIG. 6 is a graph of examples of the path-controlling accuracy of conventional methods and that of a method of the present invention.

FIG. 6 is a graph of results of actual measurements of the accuracy with which a robot hand moves along a pre-set path, using conventional path-interpolating methods. These examples show the accuracy with which an articulated robot with five degrees of freedom, an upper arm length of 800 mm, and a forearm length of 600 mm, moves along a linear path which extends for 160 mm between two separated points, at a designated speed of 100 mm/sec, in various ways. The abscissa represents time (seconds), and the sampling time is set to 30 milliseconds. The ordinate represents deviation expressed as an absolute value of displacement of the robot hand from the designated path. Referring to the graph, curve (a) represents the results when the speed of the robot is controlled in a regular manner, without any correcting operations, and curve (b) the results when the position of the robot hand is corrected by the use of a controlling speed which is proportional to the deviation of the robot hand from the designated path.

The results of an example of controlling the robot hand in practice, using the present invention, are shown by curve (c) in FIG. 6. The various control conditions of this example are exactly the same as those used in the examples of the conventional methods, the results of which being shown by the curves (a) and (b) in FIG. 6. In the example of the curve (c), the proportional coefficients in equation (5) are set so that $k_1=0.6$, $k_2=0.03$, $k_3=0$ and $k_4=0$.

As is clear from FIG. 6, the conventional methods do not correct the path of the robot hand with a sufficiently high accuracy but the present invention can provide a path-correcting accuracy which is about 3-4 times that of the curve (b) in FIG. 6.

According to the present invention, a high path-correcting accuracy can be obtained, and a high ability of moving a robot hand at a constant speed can be displayed, when the robot hand is moved along a designated path.

While the invention has been illustrated in some detail according to the preferred embodiments showed in the accompanying drawings, and while the preferred embodiments have been described in some detail, there is no intention to thus limit the invention to such detail. On the contrary, it is intended to cover all modifications alterations and equivalents falling within the spirit and scope of the appended claims.

What is claimed is:

1. A method of controlling a robot hand along a predetermined path at a predetermined speed, comprising the steps of:
   obtaining positional information and speed information of the robot hand during sampling operations as the hand endeavors to traverse the predetermined path;
   determining a command speed value of the robot hand on the basis of the positional information and the speed information; and
   using the command speed value to control a drive system of the robot hand to correct positional deviation of the robot hand from the predetermined path and speed deviation of the robot hand from the predetermined speed.

2. The method of claim 1, wherein the command speed value is determined on the basis of the sum of a value proportional to the positional deviation of the robot hand from the predetermined path, a value proportional to accumulated positional deviation determined during sampling operations carried out from a start point, a value proportional to the speed deviation of the robot hand from the predetermined speed, and a value proportional to accumulated speed deviation determined during sampling operations carried out from an initial sampling point.

3. The method of claim 2, wherein optimum values of proportional coefficients used for the sum are obtained on the basis of data output from means for detecting the position of an actuator for the robot hand.

4. A method of controlling a robot hand along a predetermined path at a predetermined speed, comprising the steps of:
   calculating path direction data from start position data and target position data stored in a memory;
   detecting a pair displacement of the robot hand by a detector provided on a robot as the robot hand endeavors to traverse the predetermined path during a sampling operation;
   converting the detected pair displacement to an actual position data in a rectangular coordinate system;
   determining a command speed value of the rotor hand for a subsequent sampling operation by using the path direction data, the target position data and the actual position data; and
   using the command speed value to control a drive system of the robot hand to correct positional deviation of the robot hand from the predetermined path and speed deviation of the robot hand from the predetermined speed.

5. The method of claim 4, wherein the command speed value is determined on the basis of the sum of a value proportional to the positional deviation of the robot hand from the predetermined path, a value proportional to accumulated positional deviation determined during sampling operations carried out from a start point, a value proportional to the speed deviation of the robot hand from the predetermined speed, and a value proportional to accumulated speed deviation determined during sampling operations carried out from an initial sampling point.

6. The method of claim 4, wherein the command speed value is determined on the basis of the equation:

$$\vec{u} = v_r\vec{a} + k_1\vec{e}/T + k_2\Sigma\vec{e}/T + k_3\vec{e}_v + k_4\Sigma\vec{e}$$

wherein u is the command speed value, v is a speed of the robot hand at a sampling time t, a is the path direction data, $\vec{e}$ is a position deviation, T is a sampling period, $\Sigma e$ represents accumulated positional deviation during the sampling operations carried out from a start point, $\vec{e}_r$ is a speed deviation, $\Sigma\vec{e}_v$ represents accumulated speed deviation during the sampling operations carried out from the initial sampling point, and $k_1$–$k_4$ are proportional coefficients.

7. The method of claim 6, wherein the proportional coeffients $k_1 \sim k_4$ are obtained from data on detected values of positions.

8. An apparatus for controlling a robot hand along a predetermined path at a predetermined speed, comprising:
   memory means for storing start position data and target position data of the robot hand;
   compute means for computing path direction data from the start position data and the target position data stored in said memory means;
   convert means interacting with said compute means for converting a pair displacement of the robot hand to actual position data in a rectangular coordinate system and for calculating an equation by using the path direction data, the target position data and the actual position data to determine a command speed value; and
   means for providing the command speed value to a driving system of the robot hand.

9. The apparatus of claim 8, wherein, in said calculate means, the command speed value is determined on the basis of the sum of a value proportional to the positional deviation of the robot hand from the predetermined path, a value proportional to accumulated positional deviation determined during sampling operations carried out from a start point, a value proportional to the speed deviation of the robot hand from the predetermined speed, and a value proportional to accumulated speed deviation determined during sampling operations carried out from an initial sampling point.

10. The apparatus of claim 8, wherein, in said convert means, the equation is $$\vec{u} = v_r\vec{a} + k_1\vec{e}/T + k_2\Sigma\vec{e}/T + k_3\vec{e}_v + k_4\Sigma\vec{e}_v$$

wherein $\vec{u}$ is the command speed value, $v_r$ is a speed of the robot hand at a sampling time t, $\vec{a}$ is the path direction data, $\vec{e}$ is a position deviation, T is a sampling period, $\Sigma\vec{e}$ represents accumulated positional deviation during sampling operations carried out from a start point, $\vec{e}_v$ is a speed deviation, $\Sigma \vec{e}_v$ represents accumulated speed deviation during the sampling operations carried out from an initial sampling point, and $k_1 \sim k_4$ are proportional coefficients.

11. The apparatus of claim 10, wherein said driving system includes a driving circuit for each degree of freedom of the robot hand and, before said providing means provides said command speed value to said driving system, said compute means, in conjunction with said convert means, converts the coordinates of said command speed value to obtain command speed values for driving each said driving circuit.

12. The method of claim 3, wherein said driving system includes a driving circuit for each degree of freedom of the robot hand, further comprising the step of converting the coordinates of said command speed value prior to providing the command speed value to said drive system, to obtain command speed values for driving each said driving circuit.

13. The method of claim 3, further comprising the step of determining said optimal values of said proportional coefficients by repeatedly driving said robot hand along said predetermined path and holding all but one of said proportional coefficients at constant values while making successive variations in the value of said one of said proportional coefficients until the relation between changes in the values of said positional deviation and said variations in said one of said proportional coefficients is altered from monotonically decreasing to monotonically increasing.

14. The method of claim 3, further comprising the steps of:
assigning the values of said proportional coefficients at arbitrary levels;
instucting said robot hand to make repeated trips along said predetermined path and making an incremental change in the value of said one of said proportional coefficients for each of said trips;
detecting the positional deviations between said predetermined path and the actual path of travel of said robot hand during each of a plurality of sampling periods occurring during each trip by said robot hand over said predetermined path;
determining the sum of the absolute values of said positional deviations for all of said sampling periods during each said trip;
comparing said sums of absolute values generated for each said trip to identify as one of said optimal values the level of said one of said proportional coefficients assigned when the relation between changes in values of said positional deviation and said one of said proportional coefficients deviates from monotonically decreasing to monotonically increasing; and
storing said one of said optimal values in a memory.

15. The method of claim 14, further comprising the steps of identifying and storing in said memory optimal values for all of said proportional coefficients.

16. The method of claim 15, further comprising the steps of:
initially setting the values of said proportional coefficients at low values;
instructing the robot hand to make repeated trips along said predetermined path;
determining the actual position of the robot hand during each of a plurality of sampling periods occurring during each of said trips;
adding the absolute values of each of said positional deviations occurring during each trip to obtain sums rpresentative of positional deviations occurring during said trip;
comparing the sum obtained at the conclusion of each trip with the sums obtained during preceding trips;
doubling the value of any one of said proportional coefficients;
performing a repeatable operation comprised of the steps of instructing the robot hand to make a trip along said predetermined path and determining the actual position of the robot hand during each of a plurality of sampling periods occurring during said trip;
increasing the value of said any one of said proportional coefficients by a uniform difference prior to initiating a subsequent trip when the value used for said any one of said proportional coefficients during the immediately preceding trip is greater than the corresponding said optimal value stored in memory, and then performing said repeatable operation;
setting the value of said any one of said proportional coefficients to a value midway between the value of said any one of the proportional coefficients used in the immediately preceding trip and the corresponding said optimal value stored in memory, when the value of said any one of said proportional coefficients used during the immediately preceding trip is less than said corresponding optimal value stored in memory, and then performing said repeatable operation;
setting the value of said any one of said proportional coefficients to a value midway between the values of said any one of the proportional coefficients used during the immediately preceding and current trips, and then performing said repeatable operation; and
designating a value midway between the value of said any one of the proportional coefficients used during the current and immediately preceding trips as the most optimal value of said any one of the proportional coefficients when the corresponding optimal value stored in memory for said any one of the proportional coefficients is equal to the value of said any one of the proportional coefficients used during the preceding trip.

17. The method of claim 7, wherein said driving system includes a driving circuit for each degree of freedom of the robot hand, further comprising the step of converting the coordinates of said command speed value prior to providing the command speed value to said drive system, to obtain command speed values for driving each said driving circuit.

18. The method of claim 7, further comprising the step of determining optimal values of said proportional coefficients by repeatedly driving said robot hand along said predetermined path and holding all but one of said proportional coefficients at constant values while making successive variations in the value of said one of said proportional coefficients until the relation between changes in the values of said positional deviation and said variations in said one of said proportional coefficients is altered from monotonically decreasing to monotonically increasing.

19. The method of claim 7, further comprising the steps of:

assigning the values of said proportional coefficients at arbitrary levels;

instructing said robot hand to make repeated trips along said predetermined path and making an incremental change in the value of said one of said proportional coefficients for each of said trips;

detecting the positional deviations between said predetermined path and the actual path of trvel of said robot hand during each of a plurality of sampling periods occurring during each trip by said robot hand over said predetermined path;

determining the sum of the absolute values of said positional deviations for all of said sampling periods during each said trip;

comparing said sums of absolute values generated for each said trip to identify as one of said optimal values the level of said one of said proportional coefficients assigned when the relation between changes in values of said positional deviation and said one of said proportional coefficients deviates from monotonically decreasing to monotonically increasing; and storing said one of said optimal values in a memory.

20. The method of claim 19, further comprising the steps of identifying and storing in said memory optimal values for all of said proportional coefficients.

21. The method of claim 20, further comprising the steps of:

initially setting the values of said proportional coefficients at low values;

instructing the robot hand to make repeated trips along said predetermined path;

determining the actual position of the robot hand during each of a plurality of sampling periods occurring during each of said trips;

adding the absolute values of each of said positional deviations occurring during each trip to obtain sums representative of positional deviations occurring during said trip;

comparing the sum obtained at the conclusion of each trip with the sums obtained during preceding trips;

doubling the value of any one of said proportional coefficients;

performing a repeatable operation comprised of the steps of instructing the robot hand to make a trip along said predetermined path and determining the actual position of the robot hand during each of a plurality of sampling periods occurring during said trip;

increasing the value of said any one of said proportional coefficients by a uniform difference prior to initiating a subsequent trip when the value used for said any one of said proportional coefficients during the immediately preceding trip is greater than the corresponding said optimal value stored in memory, and then performing said repeatable operation;

setting the value of said any one of said proportional coefficients to a value midway between the value of said any one of the proportional coefficients used in the immediately preceding trip and the corresponding said optimal value stored in memory, when the value of said any one of said proportional coefficients used during the immediately preceding trip is less than said corresponding optimal value stored in memory, and then performing said repeatable operation;

setting the value of said any one of said proportional coefficients to a value midway between the values of said any one of the proportional coefficients used during the immediately preceding and current trips, and then performing said repeatable operation; and designating a value midway between the value of said any one of the proportional coefficients used during the current and immediately preceding trips as the most optimal value of said any one of the proportional coefficients when the corresponding optimal value stored in memory for said any one of the proportional coefficients is equal to the value of said any one of the proportional coefficients used during the preceding trip.

22. An apparatus for controlling a robot hand along a predetermined path at a predetermined speed, comprising:

memory means for storing start position data and target position data for the robot hand;

compute means for computing path direction data from the start position data and the target position data stored in said memory means;

convert means interacting with said compute means for converting a pair displacement of the robot hand obtained during sampling operations as the robot hand endeavors to traverse the predetermined path, into actual position data in a rectangular coordinate system and for calculating an equation by using the path direction data, the target position data and the actual position data to determine a command speed value of the robot hand; and means using the command speed while controlling a system driving the robot hand during a subsequent sampling operation for correcting positional deviation of the robot hand from the predetermined path and speed deviation of the robot hand from the predetermined speed.

23. A method of controlling a robot hand along a path, comprising the steps of:

calculating path direction data from start position data and target position data stored in a memory;

detecting a pair displacement of the robot hand by a detector provided on a robot;

converting the detected pair displacement to actual position data in a rectangular coordinate system;

determining a command speed value of the robot hand for a subsequent sampling operation by using the path direction data, the target position data and the actual position data on the basis of the equation:

$$\vec{u} = v_t \vec{a} + k_1 \vec{e}/T + k_2 \Sigma \vec{e}/T + k_3 \vec{e}_v + k_4 \Sigma \vec{e}_v$$

wherein $\vec{u}$ is the command speed value, $v_t$ is a speed of the robot hand at a sampling time t, $\vec{a}$ is the path direction data, $\vec{e}$ is a positional deviation, T is a sampling period, $\Sigma \vec{e}$ represents accumulated positional deviation during the sampling operations carried out from a start point, $\vec{e}_v$ is a speed deviation, $\Sigma \vec{e}_v$ represents accumulated speed deviation during the sampling operations carried out from the initial sampling point, and $k_1$–$k_4$ are proportional coefficients; and providing the command speed value to a drive system of the robot hand.

24. The method of claim 23, wherein the proportional coefficients $k_1$–$k_4$ are obtained from data corresponding to detected values of positions.

25. The method of claim 24, wherein said drive system includes a driving circuit for each degree of freedom of the robot hand, further comprising the step of converting the coordinates of said command speed value prior to providing the command speed value to said drive system, to obtain command speed values for driving each said driving circuit.

26. The method of claim 24, further comprising the step of determining optimal values of said proportional coefficients by repeatedly driving said robot hand along said path and holding all but one of said proportional coefficients at constant values while making successive variations in the value of said one of said proportional coefficients until the relation between changes in the values of said positional deviation and said variations in said one of said proportional coefficients is altered from monotonically decreasing to monotonically increasing.

27. The method of claim 24, further comprising the steps of:
assigning the values of said proportional coefficients at arbitrary levels;
instructing said robot hand to make repeated trips along said path and making an incremental change in the value of said one of said proportional coefficients for each of said trips;
detecting the positional deviations between said path and the actual path of travel of said robot hand during each of a plurality of sampling periods occurring during each trip by said robot hand over said path;
determining the sum of the absolute values of said positional deviations for all of said sampling periods during each said trip;
comparing said sums of absolute values generated for each said trip to identify as one of said optimal values the level of said one of said proportional coefficients assigned when the relation between changes in values of said positional deviation and said one of said proportional coefficients deviates from monotonically decreasing to monotonically increasing; and
storing said one of said optimal values in a memory.

28. The method of claim 27, further comprising the steps of identifying and storing in said memory optimal values for all of said proportional coefficients.

29. The method of claim 28, further comprising the steps of:
initially setting the values of said proportional coefficients at low values;
instructing the robot hand to make repeated trips along said path;
determining the actual position of the robot hand during each of a plurality of sampling periods occurring during each of said trips.

30. An apparatus for controlling a robot hand along a path comprising:
memory means for storing start position data and target position data of the robot hand;
compute means for computing path direction data from the start position data and the target position data stored in said memory means;
convert means for converting a pair displacement of the robot hand to actual position data in a rectangular coordinate system;
calculate means for calculating a command speed value u by using the path direction data, the target position data and the actual position data to determine a command speed value, on the basis of an equation wherein:

$$\vec{u} = v_t \vec{a} + k_1 e/T + k_2 \Sigma \vec{e}/T + k_3 \vec{e}_v + k_4 \Sigma \vec{e}_v$$

and v is a speed of the robot hand at a sampling time t, $\vec{a}$ is the path direction data, e is a position deviation, T is a sampling period, $\Sigma \vec{e}$ represents accumulated positional deviation during sampling operations carried out from a start point, $\vec{e}_v$ is a speed deviation, $\Sigma \vec{e}$ represents accumulated speed deviation during the sampling operations carried out from an initial sampling point, and $k_1 - k_4$ are proportional coefficients; and
means for providing the command speed value to a driving system of the robot hand.

31. The apparatus of claim 30, wherein said driving system includes a driving circuit for each degree of freedom of the robot hand and, before said providing means provides said command speed value to said driving system, and compute means, in conjunction with said convert means, converts the coordinates of said command speed value to obtain command speed values for driving each said driving circuit.

32. A method of controlling a robot hand along a path, comprising the steps of:
obtaining positional information and speed information about the robot hand;
determining a command speed value of the robot hand on the basis of the sum of a value proportional to the positional deviation of the robot hand from the path, a value proportional to accumulated positional deviation determined during sampling operations carried out from a start point, a value proportional to the speed deviation of the robot hand from a speed, a value proportional to accumulated speed deviation determined during sampling operations carried out from an initial sampling point, and optimum values of proportional coefficients obtained on the basis of data output from means for detecting the position of an actuator for the robot hand;
determining said optimal values of said proportional coefficients by repeatedly driving said robot hand along said path and holding all but one of said proportional coefficients at constant values while making successive variations in the value of said one of said proportional coefficients until the relation between the values of said positional deviation and said variations in said one of said proportional coefficients is altered from monotonically decreasing to monotonically increasing; and
providing the command speed values to a drive system of the robot hand.

33. The method of claim 32, further comprising the steps of:
assigning the values of said proportional coefficients at arbitrary levels;
instructing said robot hand to make repeated trips along said path and making an incremental change in the value of said one of said proportional coefficients for each of said trips;
detecting the positional deviations between said path and the actual path of travel of said robot hand during each of a plurality of sampling periods occurring during each trip by said robot hand over said path;

determining the sum of the absolute values of said positional deviations for all of said sampling periods during each said trip;

comparing said sums of absolute values generated for each said trip to identify as one of said optimal values the level of said one of said proportional coefficients assigned when the relation between changes in values of said positional deviation and said one of said proportional coefficients deviates from monotonically decreasing to monotonically increasing; and storing said one of said optimal values in a memory.

34. The method of claim 33, further comprising the steps of identifying and storing in said memory optimal values for all of said proportional coefficients.

35. The method of claim 34, further comprising the steps of:

initially setting the values of said proportional coefficients at low values;

instructing the robot hand to make repeated trips along said path;

determining the actual position of the robot hand during each of a plurality of sampling periods occurring during each of said trips;

adding the absolute values of each of said positional deviations occurring during each trip to obtain sums representative of positional deviations occurring during said trip;

comparing the sum obtained at the conclusion of each trip with the sums obtained during preceding trips;

doubling the value of any one of said proportional coefficients;

performing a repeatable operation comprised of the steps of instructing the robot hand to make a trip along said path and determining the actual position of the robot hand during each of a plurality of sampling periods occurring during said trip;

increasing the value of said any one of said proportional coefficients by a uniform difference prior to initiating a subsequent trip when the value used for said any one of said proportional coefficients during the immediately preceding trip is greater than the corresponding said optimal value stored in memory, and then performing said repeatable operation;

setting the value of said any one of said proportional coefficients to a value midway between the value of said any one of the proportional coefficients used in the immediately preceding trip and the corresponding said optimal value stored in memory, when the value of said any one of said proportional coefficients used during the immediately preceding trip is less than said corresponding optimal value stored in memory, and then performing said repeatable operation;

setting the value of said any one of said proportional coefficients to a value midway between the values of said any one of the proportional coefficients used during the immediately preceding and current trips, and then performing said repeatable operation; and designating a value midway between the value of said any one of the proportional coefficients used during the current and immediately preceding trips as the most optimal value of said any one of the proportional coefficients when the corresponding optimal value stored in memory for said any one of the proportional coefficients is equal to the value of said any one of the proportional coefficients used during the preceding trip.

* * * * *